US011904329B2

(12) United States Patent
Kajuch et al.

(10) Patent No.: US 11,904,329 B2
(45) Date of Patent: Feb. 20, 2024

(54) DIGITAL RAIN SHOWERHEAD

(71) Applicant: Kohler Co., Kohler, WI (US)

(72) Inventors: Pete Kajuch, Brookfield, WI (US); Joseph Valenti, Newton, WI (US)

(73) Assignee: KOHLER CO., Kohler, WI (US)

( * ) Notice: Subject to any disclaimer, the term of this patent is extended or adjusted under 35 U.S.C. 154(b) by 498 days.

(21) Appl. No.: 17/220,650

(22) Filed: Apr. 1, 2021

(65) Prior Publication Data

US 2021/0308698 A1 Oct. 7, 2021

Related U.S. Application Data

(60) Provisional application No. 63/004,753, filed on Apr. 3, 2020.

(51) Int. Cl.

*B05B 1/18* (2006.01)
*F21V 33/00* (2006.01)
*B05B 1/16* (2006.01)

(52) U.S. Cl.

CPC ................ *B05B 1/185* (2013.01); *B05B 1/16* (2013.01); *F21V 33/004* (2013.01)

(58) Field of Classification Search

CPC .......... B05B 1/185; B05B 1/16; F21V 33/004
See application file for complete search history.

(56) References Cited

U.S. PATENT DOCUMENTS 4,700,884 A 10/1987 Barrett et al.
5,853,130 A 12/1998 Ellsworth
6,042,027 A * 3/2000 Sandvik .................... B05B 1/16 4/615
6,382,531 B1 * 5/2002 Tracy ...................... B05B 1/185 239/533.13
6,925,661 B1 8/2005 Anger
(Continued)

FOREIGN PATENT DOCUMENTS

CN 205518286 U 8/2016
CN 106076681 A 11/2016
(Continued)

OTHER PUBLICATIONS

International Search Report and Written Opinion on PCT/US2021/025452 dated Sep. 10, 2021 (11 pages).

*Primary Examiner* — Craig M Schneider
*Assistant Examiner* — Frederick D Soski
(74) *Attorney, Agent, or Firm* — FOLEY & LARDNER LLP

(57) ABSTRACT

A showerhead assembly that includes a showerhead housing, a distributor, and a valve layer. The showerhead housing includes a top plate, a bottom plate, and a plurality of sidewalls extending between the top plate and the bottom plate, where the top plate includes a fluid inlet configured to couple to a fluid source. The distributor includes at least one distributor outlet, and is situated in the showerhead housing. The valve layer includes at least one valve assembly, and is situated in the showerhead housing. The at least one valve assembly is coupled to the bottom plate. The at least one channel of the distributor is further configured to disperse fluid from the fluid inlet to the at least one distributor outlet, and the at least one distributor outlet is coupled to, and configured to disperse fluid to, the at least one valve assembly of the valve layer.

20 Claims, 6 Drawing Sheets

(56) References Cited

U.S. PATENT DOCUMENTS 7,857,234 B2 12/2010 Daley et al.
7,889,187 B2 2/2011 Freier et al.
8,070,072 B2 12/2011 Lin
8,694,168 B2 4/2014 Lin
8,876,023 B2 11/2014 Peel et al.
9,085,880 B2 7/2015 Hanna et al.
9,212,473 B2 12/2015 Baker et al.
9,322,151 B2 4/2016 Janakiraman et al.
9,387,493 B2 7/2016 Lev
9,632,514 B2 4/2017 Marty et al.
9,757,741 B2 9/2017 Hawkins
9,775,772 B2 10/2017 Tempas et al.
9,957,700 B2 5/2018 Peel
10,036,149 B2 7/2018 Wallerstorfer
10,301,799 B2 5/2019 Thompson et al.
10,413,917 B2 9/2019 Rexach et al.
10,480,165 B2 11/2019 Reeder et al.
10,489,038 B2 11/2019 Klicpera
2003/0042332 A1* 3/2003 Lai ........................ B05B 1/1636 239/446
2005/0284967 A1* 12/2005 Korb ........................ B05B 1/185 239/600
2008/0006707 A1 1/2008 Nobili
2012/0233768 A1* 9/2012 Kull ...................... B05B 12/002 4/615
2014/0138461 A1* 5/2014 Kajuch ................. B05B 1/1654 239/393
2015/0204056 A1* 7/2015 Yuan ....................... F16K 11/00 239/417.5
2015/0208152 A1* 7/2015 Hanna ................... F21V 33/004 381/387
2015/0218784 A1 8/2015 Mazz et al.
2016/0059245 A1* 3/2016 Rexach ................. B05B 1/3046 239/562
2016/0076231 A1 3/2016 Goel et al.
2016/0077530 A1 3/2016 Moran et al.
2016/0258144 A1 9/2016 Tayenaka et al.
2016/0339457 A1* 11/2016 Hou .......................... B05B 1/12
2017/0043358 A1* 2/2017 Zhang ................... B05B 1/1627
2017/0089317 A1* 3/2017 Lin ........................... B05B 3/04
2017/0128960 A1 5/2017 D'Urso et al.
2017/0189918 A1* 7/2017 Winter .................... B05B 1/185 239/444
2017/0259279 A1* 9/2017 Lin ......................... B05B 15/65
2017/0320084 A1* 11/2017 Lin ....................... B05B 1/3026
2017/0350103 A1 12/2017 Lee et al.
2018/0065131 A1* 3/2018 Rogers .................. F16K 31/535
2018/0085763 A1 3/2018 Leckner
2018/0094413 A1 4/2018 Chaky
2018/0193852 A1* 7/2018 L'Henaff ............... G08C 17/02
2018/0280995 A1* 10/2018 Huang .................... B05B 12/10
2018/0340624 A1 11/2018 Wang et al.
2019/0089550 A1 3/2019 Rexach et al.
2019/0119890 A1 4/2019 Alcantara Talavera
2019/0141425 A1 5/2019 Hanna et al.
2019/0143348 A1* 5/2019 Quinn ................... B05B 1/1636 239/562
2019/0217313 A1* 7/2019 Yang ......................... B05B 1/16
2019/0352889 A1* 11/2019 Mock ...................... E03C 1/055
2019/0365160 A1* 12/2019 Hawkins ................... B05B 1/16
2019/0366374 A1 12/2019 Deivasigamani et al.
2020/0023387 A1* 1/2020 Nikles ................... E03C 1/0409
2020/0086334 A1* 3/2020 Parisi-Amon ........... B05B 1/169
2020/0206752 A1* 7/2020 Wu ......................... B05B 1/169
2020/0206755 A1* 7/2020 Wu ......................... B05B 1/185
2020/0222918 A1* 7/2020 Grigor ...................... B05B 1/18
2020/0406275 A1* 12/2020 Tu ........................... E03C 1/046
2021/0016301 A1* 1/2021 Cipriani .................. B05B 15/62
2021/0205826 A1* 7/2021 Yu ......................... B05B 11/007

FOREIGN PATENT DOCUMENTS

CN 106216113 A 12/2016
EP 3 029 208 A1 6/2016
EP 3 375 338 A1 9/2018

* cited by examiner

DIGITAL RAIN SHOWERHEAD

CROSS REFERENCE TO RELATED PATENT APPLICATIONS

The present application claims the benefit of and priority to U.S. Provisional Application No. 63/004,753, filed on Apr. 3, 2020, the entire disclosure of which is hereby incorporated by reference herein.

BACKGROUND

The present disclosure relates generally to water delivery devices, such as showerhead assemblies. More specifically, the present disclosure relates to showerhead assemblies that can create spray experiences. The spray experiences may be functional spray experiences (e.g. massage, mist, rain, etc.) or visual imagery experiences from water droplets.

Generally speaking, some large scale devices can produce visual imagery using water droplets to provide aesthetic displays (e.g., Graphical Waterfall®, etc.). These devices can provide unique patterns, textual messages, or other imagery by controlling water flow from individual spray outlets. These devices are typically built with large industrial valves and use a large volume of water that may be recirculated in a closed loop. This large scale construction is not suitable for a consumer shower environment.

It would be advantageous to provide a showerhead that can create unique spray experiences that are suitable for use in a shower environment. These and other advantageous features will be apparent to those reviewing the present disclosure.

SUMMARY

At least one embodiment relates to a showerhead assembly including a showerhead body having a top plate, a bottom plate, and a plurality of sidewalls extending between the top plate and the bottom plate. The showerhead assembly also includes a fluid inlet configured to receive a fluid and a distributor fluidly coupled to the fluid inlet. The distributor includes a plurality of channels and a plurality distributor outlets, wherein the plurality of channels are configured to disperse the fluid from the fluid inlet to each distributor outlet of the plurality of distributor outlets. The showerhead assembly further includes a plurality of valve assemblies integrated into the showerhead body, each valve assembly including a conduit having a valve assembly inlet and a valve assembly outlet, wherein the valve assembly inlet is fluidly coupled to at least one of the distributor outlets. The valve assemblies also include a valve fluidly coupled to the conduit, wherein the valve is configured to selectively allow the fluid to flow from the valve assembly inlet to the valve assembly outlet. Each of the valves are configured to selectively allow the fluid to flow from the valve assembly inlet to the valve assembly outlet independently.

Another embodiment relates to a valve layer comprising a plurality of valve assemblies integrated into a shower appliance. Each valve assembly includes a conduit having a valve assembly inlet and a valve assembly outlet. Each of the valve assembly inlets is fluidly coupled to at least one distributor outlet of a distributor. A valve is fluidly coupled to the conduit, wherein the valve is configured to selectively allow the fluid to flow from the valve assembly inlet to the valve assembly outlet wherein each of the valves are configured to selectively allow the fluid to flow from the valve assembly inlet to the valve assembly outlet independently.

Another embodiment relates to a shower appliance including a valve layer. The valve layer includes a plurality of valve assemblies integrated into a shower appliance, each valve assembly including a conduit having a valve assembly inlet and a valve assembly outlet. The valve assembly inlet is fluidly coupled to at least one distributor outlet of a distributor. A valve is fluidly coupled to the conduit, wherein the valve is configured to selectively allow the fluid to flow from the valve assembly inlet to the valve assembly outlet. The shower appliance further includes a controller communicably coupled to the valve layer wherein the controller is configured to selectively allow the fluid to flow from the valve assembly inlet to the valve assembly outlet of each of the valve assemblies independently.

One other embodiment relates to a showerhead assembly that includes a showerhead housing, a distributor, and a valve layer. The showerhead housing includes a top plate, a bottom plate, and a plurality of sidewalls extending between the top plate and the bottom plate, where the top plate includes a fluid inlet configured to couple to a fluid source. The distributor includes at least one distributor outlet, and the distributor is situated in the showerhead housing. The valve layer includes at least one valve assembly, and the valve layer is situated in the showerhead housing and the at least one valve assembly is coupled to the bottom plate. The at least one channel of the distributor is further configured to disperse fluid from the fluid inlet to the at least one distributor outlet, and the at least one distributor outlet is coupled to, and configured to disperse fluid to, the at least one valve assembly of the valve layer.

Another embodiment relates to a showerhead assembly that includes a showerhead housing, a distributor, a valve layer, and a frame member. The showerhead housing includes a top plate, a bottom plate, and a plurality of sidewalls extending between the top plate and the bottom plate, where the top plate includes a fluid inlet configured to couple to a fluid source. The distributor may be disposed in the showerhead housing, and includes a plurality of channels and a plurality of distributor outlets, where the plurality of channels are configured to receive fluid from the fluid inlet and disperse fluid to the plurality of distributor outlets. The valve layer may also be disposed in the showerhead housing and includes a plurality of valve assemblies, where the plurality of valve assemblies are coupled to, and configured to receive fluid from, the plurality of distributor outlets. The frame member may be coupled to the bottom plate and the showerhead housing.

One other embodiment relates to a showerhead assembly system that includes one or one or more processing circuits comprising one or more memory devices coupled to one or more processors, the one or more memory devices configured to store instructions thereon that, when executed by the one or more processors, cause the one or more processors to perform operations including: generate a geometric pattern sequence for a plurality of valve assemblies. The operations further including compare a plurality of pressures of each of the plurality of valve assemblies based on the geometric pattern sequence to a plurality of threshold pressures of each of the plurality of valve assemblies, and compare a fluid flow rate based on the geometric pattern sequence to a threshold range of fluid flow rates. The operations also including execute the geometric pattern sequence in response to comparing the plurality of pressures of each of the plurality of valve assemblies based on the geometric pattern sequence to the plurality of threshold pressures of each of the plurality of valve assemblies and comparing the fluid flow rate based on the geometric pattern sequence to the threshold range of fluid flow rates This summary is illustrative only and is not intended to be in any way limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Generally speaking, most conventional devices for creating imagery from water droplets are large and do not have a spatial resolution of spray control fine enough to fit in a showerhead. Further, most conventional showerheads cannot independently control the flow of water through groups of outlets, so as to create patterns, textual messages, or images from water droplets.

Referring generally to the FIGURES, disclosed herein are various embodiments of a digital showerhead including a plurality of valve assemblies, wherein each of the valve assemblies is configured to be selectively controlled, so as to independently control a flow of fluid through each valve assembly relative to each other. In this manner, the disclosed showerhead can provide a digital rainshower that is capable of delivering water to provide unique spray experiences in a shower environment.

Figure 1:
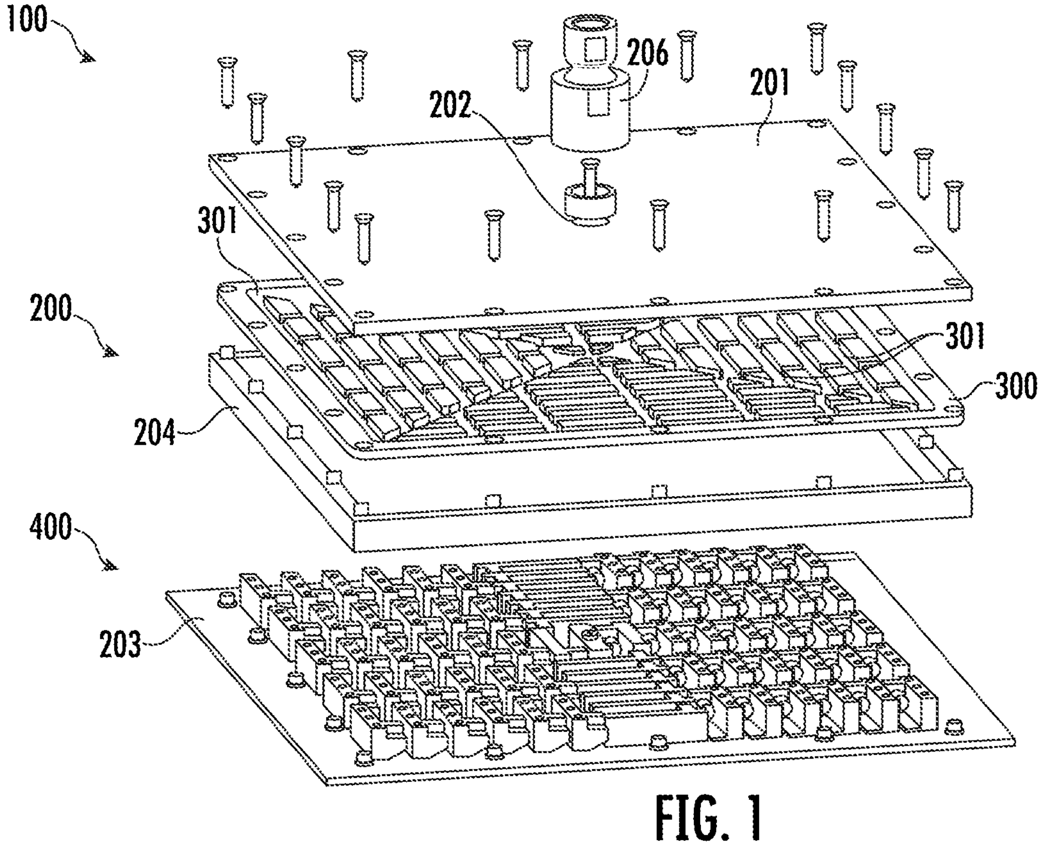
FIG. 1 is an exploded view of a showerhead assembly, according to an exemplary embodiment.
Figure 2:
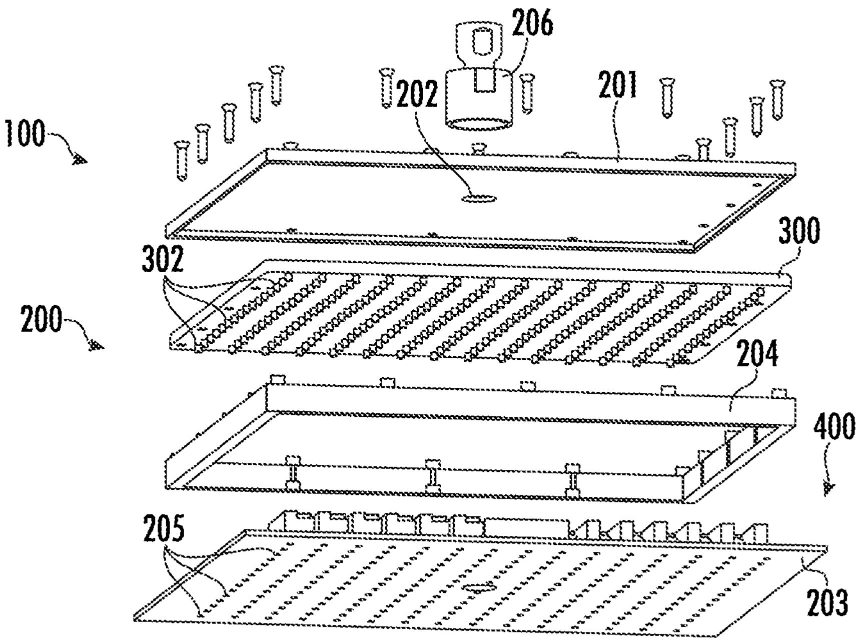
FIG. 2 is an exploded view of the showerhead assembly of FIG. 1.

Referring to FIGS. 1 and 2, according to an exemplary embodiment, a showerhead assembly 100 includes a showerhead housing 200, a distributor 300, and a valve layer 400. The embodiment of FIG. 1 illustrates showerhead housing 200 as including a top plate 201 having a fluid inlet 202, a bottom plate 203, and a plurality of sidewalls 204 extending between the top plate 201 and the bottom plate 203. The fluid inlet 202 is configured to couple to a fluid source (e.g., a household water line at a conventional ball joint 206, etc.). The bottom plate 203 is configured to have a plurality of showerhead outlets 205.

The distributor 300 includes a plurality of channels 301 and a plurality of distributor outlets 302. The plurality of channels 301 are configured to disperse the fluid from the fluid inlet 202 to each of the distributor outlets 302. Each of the distributor outlets 302 is fluidly coupled to a valve assembly 410 of the valve layer 400. The valve layer 400 includes a plurality of valve assemblies 410.

Figure 3:
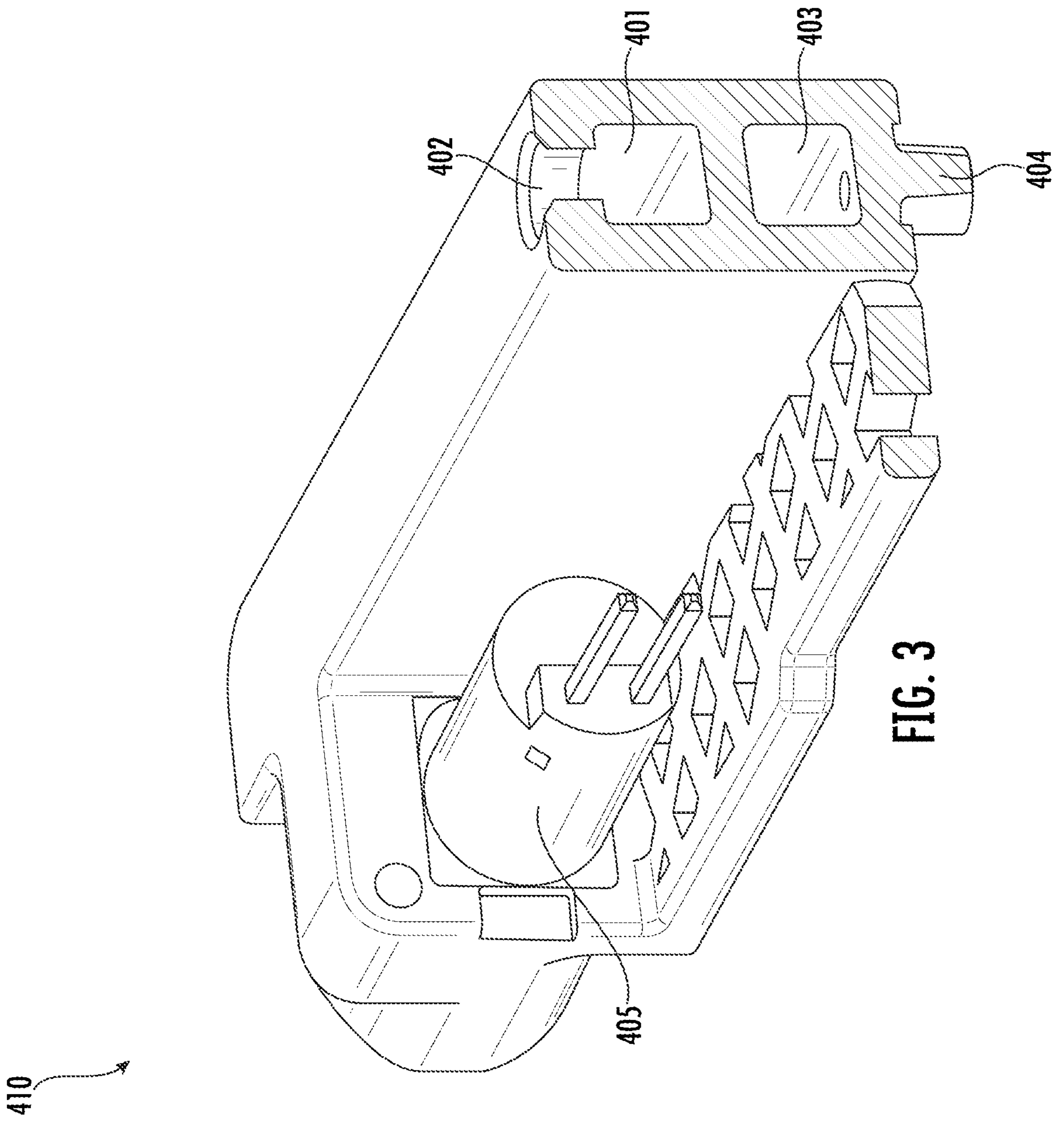
FIG. 3 is an illustration of a cross section of a valve assembly, according to an exemplary embodiment.

Referring to FIG. 3, according to an exemplary embodiment, the valve assembly 410 includes an inlet conduit 401 having a valve assembly inlet 402. The valve assembly inlet 402 is fluidly coupled to one of the distributor outlets 302. The inlet conduit 401 is fluidly coupled to an outlet conduit 403 having a valve assembly outlet 404. The inlet conduit 401 and the outlet conduit 403 are each fluidly coupled to a valve 405. The valve 405 (e.g., a solenoid valve, a proportional valve, etc.) has an open state and a closed state. When the valve 405 is in the open state, fluid flows from the valve assembly inlet 402 to the valve assembly outlet 404. Conversely, when the valve 405 is in the closed state, the flow of fluid from the valve assembly inlet 402 to the valve assembly outlet 404 is inhibited. For example, when the valve 405 is in the open state, the valve assembly inlet 402 can receive fluid, the fluid flows into the inlet conduit 401, to the outlet conduit 403, and exits the valve assembly 410 through the valve assembly outlet 404. Conversely, when the valve 405 is in the closed state, the flow of fluid from the valve assembly inlet 402 to the valve assembly outlet 404 is fully blocked. The valve assembly inlet 402 can receive fluid, however, the valve 405 inhibits the fluid from exiting the valve assembly 410 through the valve assembly outlet 404. In an exemplary embodiment, the valve 405 begins in the open state, and may be selectively changed to the closed state in response to an input, as described below. In another embodiment, the valve 405 may begin in the closed state, and may be selectively changed to the open state.

Figure 4:
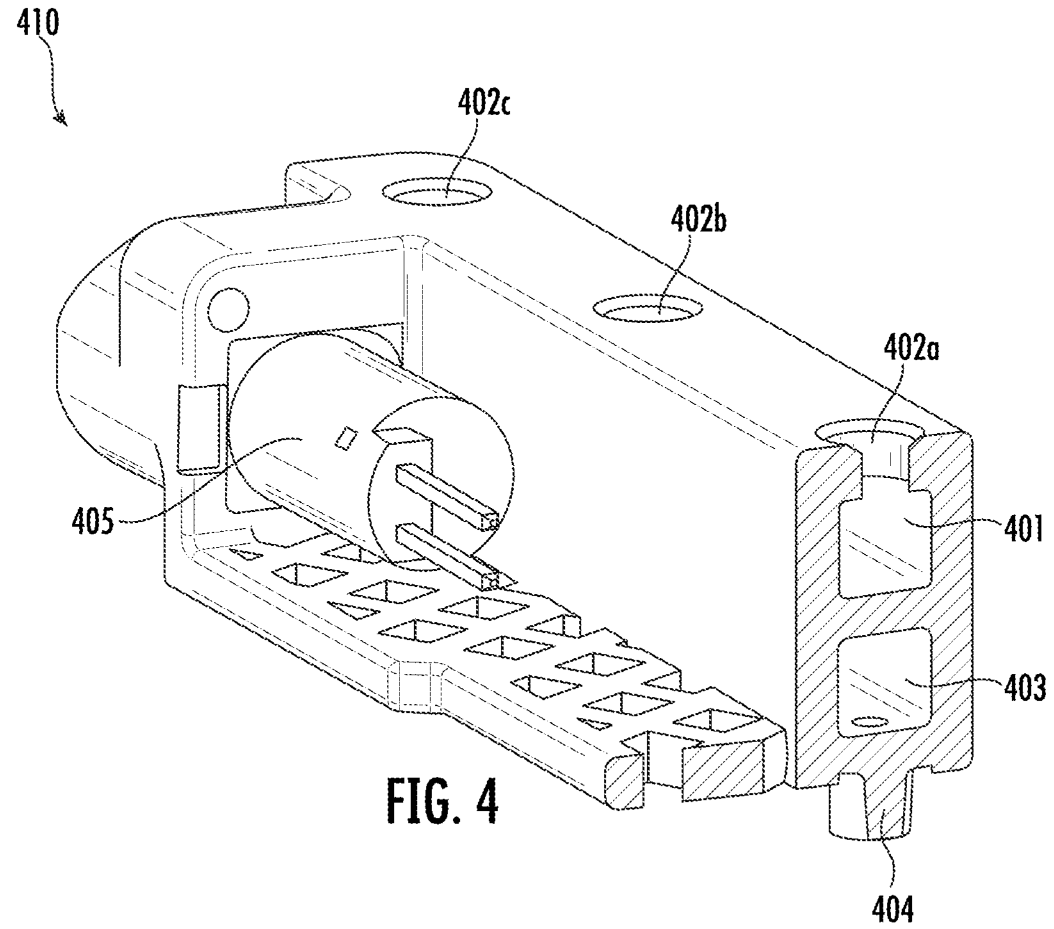
FIG. 4 is an illustration of a cross section of a valve assembly, according to an exemplary embodiment.

Referring to FIG. 4, according to another exemplary embodiment, the valve assembly 410 further includes a plurality of valve assembly inlets 402*a*, 402*b*, and 402*c*. Each of the plurality of valve assembly inlets 402*a*, 402*b*, and 402*c* are fluidly coupled to the inlet conduit 401. The valve assembly 410 also further includes a plurality of valve assembly outlets (shown by way of example as a single valve assembly outlet 404, but may include a plurality of valve assembly outlets 404). When the valve 405 is in the open state, fluid flows from each of the plurality of valve assembly inlets 402*a*, 402*b*, and 402*c* into the inlet conduit 401, to the outlet conduit 403, and exits the valve assembly 410 through each of the plurality of valve assembly outlets 404. In some embodiments, the valve assembly 410 has more valve assembly inlets 402 than valve assembly outlets 404. According to another exemplary embodiment, the valve assembly 410 has fewer valve assembly inlets 402 than valve assembly outlets 404. The valve assembly inlets 402 and the valve assemble outlets 404 may also be arranged in a variety of pattern arrangements. For example, a plurality of valve assembly inlets 402 and a plurality of valve assembly outlets 404 may include three inlets/outlets arranged in a linear pattern arrangement (as shown in FIG. 4), three inlets/outlets arranged in a triangular pattern arrangement, four inlets/outlets arranged in a square pattern arrangement, or any other suitable arrangement of the inlets/outlets for the valve assembly 410.

Figure 5:
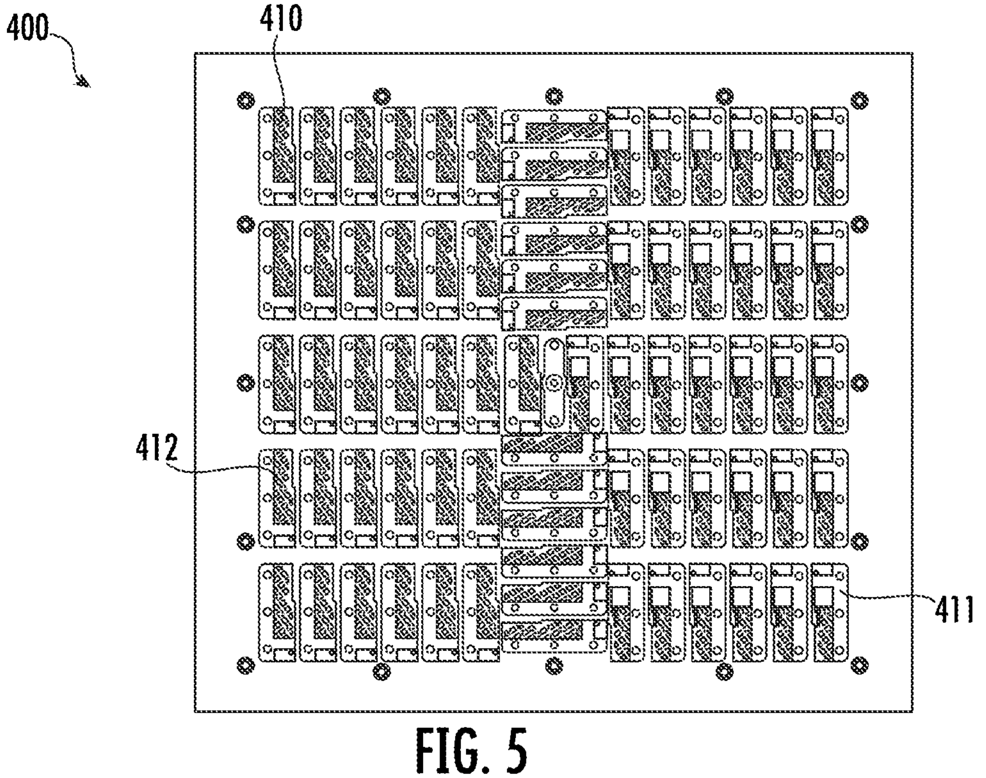
FIG. 5 is an illustration of a valve layer, according to an exemplary embodiment.

Referring to FIG. 5, according to an exemplary embodiment, the valve layer 400 includes a plurality of valve assemblies 410 coupled to the bottom plate 203. The valve assemblies 410 may be arranged in a plurality of configurations. As shown, each of the valve assemblies 410 is oriented in either a vertical position or a horizontal position relative to the bottom plate 203. In other embodiments, each of the valve assemblies 410 are oriented in a horizontal position. In another embodiment, each of the valve assemblies 410 are oriented in a vertical position. In even further embodiments, each of the valve assemblies 410 can be arranged in any orientation between a horizontal position and a vertical position. Each of the valve assembly outlets 404 is fluidly coupled to one of the showerhead outlets 205.

Figure 6:
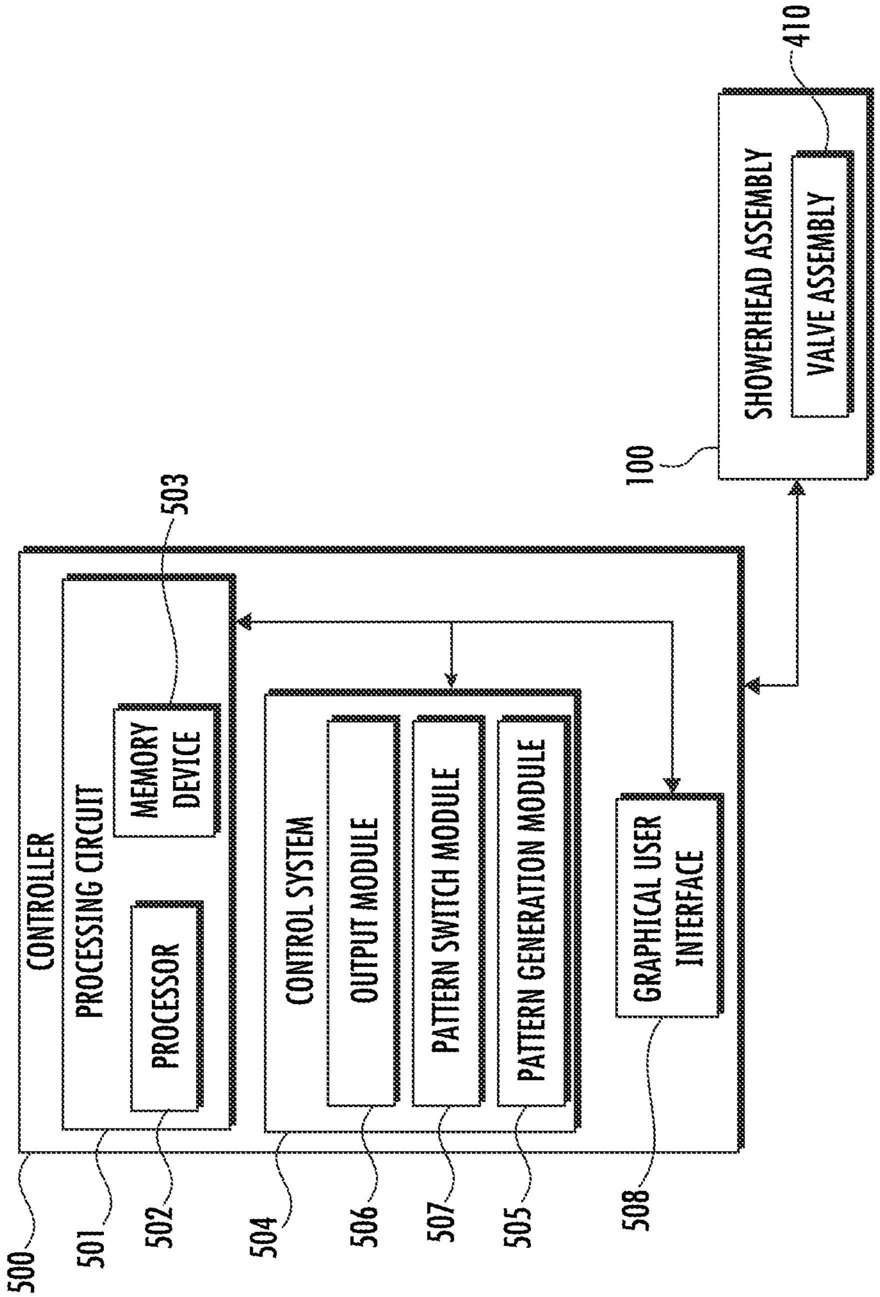
FIG. 6 is an illustration of a shower appliance controller, according to an exemplary embodiment.

Referring to FIG. 6, according to an exemplary embodiment, a controller 500 is communicably coupled to each of the plurality of valve assemblies 410 of the showerhead assembly 100. The controller 500 includes a processing circuit 501 having a processor 502 and a memory device 503, a control system 504 having a pattern generation module 505, an output module 506 and a pattern switch module 507, and a graphical user interface 508.

Processing circuit 501 is shown to include the processor 502 and the memory device 503. The processor 502 may be a general purpose or specific purpose processor, an application specific integrated circuit (ASIC), one or more field programmable gate arrays (FPGAs), a group of processing components, or other suitable processing components. The processor 502 may be configured to execute computer code or instructions stored in memory or received from other computer readable media (e.g., CDROM, network storage, a remote server, etc.).

The memory device 503 may include one or more devices (e.g., memory units, memory devices, storage devices, etc.) for storing data and/or computer code for completing and/or facilitating the various processes described in the present disclosure. The memory device 503 may include random access memory (RAM), read-only memory (ROM), hard drive storage, temporary storage, non-volatile memory, flash memory, optical memory, or any other suitable memory for storing software objects and/or computer instructions. The memory device 503 may include database components, object code components, script components, or any other type of information structure for supporting the various activities and information structures described in the present disclosure. The memory device 503 may be communicably connected to the processor 502 via the processing circuit 501 and may include computer code for executing one or more processes described herein.

In some embodiments, the graphical user interface 508 may be any suitable interface (e.g., module interface, communication interface, human interface, etc.). The graphical user interface 508 may include wired or wireless interfaces (e.g., jacks, antennas, transmitters, receivers, transceivers, wire terminals, etc.) for conducting data communications with various systems, devices, or networks. For example, the graphical user interface 508 may include an Ethernet card and port for sending and receiving data via an Ethernet-based communications network. In another example, the graphical user interface 508 may include a WiFi transceiver for communicating via a wireless communications network. The graphical user interface 508 may be configured to communicate via local area networks or wide area networks (e.g., the Internet, a building WAN, etc.) and may use a variety of communications protocols (e.g., TCP/IP, point-to-point, etc.). In some embodiments, the controller 500 uses the graphical user interface 302 to receive input from various sensors and send control signals to various operable components.

The control system 504 is configured to selectively control each of the valve assemblies 410 between the open state and the closed state. As referenced above with regard to FIG. 4, the control system 504 may control the valve assemblies 410 to begin in the open state, and then selectively change the valve assemblies 410 to the closed state in response to an input (e.g., activating showerhead assembly 100, communicating with a graphical user interface, etc.). In an exemplary embodiment, the control system 504 may then selectively change the valve assemblies 410 again to the closed state to create a pattern, as described below. In other embodiments, the control system 504 may control the valve assemblies 410 to begin in the closed state, and may selectively change the valve assemblies 410 to the open state to create a pattern.

In addition, the state of each of the valve assemblies 410 is controlled by the control system 504 independently from the state of each of the other valve assemblies 410. For example, according to an exemplary embodiment, the valve layer 400 further includes a first valve assembly 411 and a second valve assembly 412. The control system 504 can selectively change the first valve assembly 411 from the closed state to the open state, or from the open state to the closed state, without modifying the state of the second valve assembly 412. The controller 500 can also selectively change the second valve assembly 412 from the closed state to the open state, or from the open state to the closed state, without modifying the state of the first valve assembly 411. The state of the first valve assembly 411 is independent from the state of the second valve assembly 412.

The output module 506 is configured to selectively change the state of each valve assembly 410 of the valve layer 400 to create a geometric fluid pattern of the fluid exiting the each valve assembly 410 of the valve layer 400. The output module 506 can selectively change the state of each valve assembly 410 of the valve layer 400 in any sequence. According to an exemplary embodiment, each of the valve assembly outlets 404 may be arranged within the valve layer 400 in rows and columns. The output module 506 may selectively change the valve assembly 410 of each column from the closed state to the open state, from left to right to create a horizontal rolling geometric sequence. The output module 506 may also selectively change the valve assembly 410 of each row from the closed state to the open state, from the top to bottom to create a vertical rolling geometric sequence. The output module 506 can create a geometric pattern sequence based on any mathematically defined sequence.

In some embodiments, the pattern generation module 505 may be communicably coupled to the graphical user interface 508 (e.g., display, mobile phone, laptop, etc.). The graphical user interface 508 is configured to allow the creation of custom defined pattern sequences. A user can directly control the state of each of the valve assemblies 410, as well as, define custom pattern sequences of the valve assemblies 410. The graphical user interface 508 may represent the valve assembly outlets 404 as a grid. The graphical user interface 508 may also show a pattern selection, a pattern speed, and a pattern direction.

The output module 506 is configured to monitor the fluid flow rate (e.g., gallons per minute) through the showerhead assembly 100. When a flow pattern sequence is selected, the output module 506 may calculate the flow rate throughout the flow pattern sequence to ensure the fluid flow rate stays between a minimum flow rate and a maximum flow rate range. If the calculated flow rate is not within the range, the output module 506 will prohibit the flow pattern sequence from initiating.

The pattern switch module 507 is configured receive a pattern from the pattern generation module 505, and determine a sequence for the state of each of the valve assemblies 410. For example, the pattern switch module 507 receives a pattern sequence from the pattern generation module 505, and determines which of the valve assemblies 410 are in the open state, and which of the valve assemblies 410 are in the closed state. The pattern switch module 507 then determines a future state for each of the valve assemblies 410, which is the state (e.g., open state or closed state) each valve assembly 410 must be next according to the received pattern sequence. The pattern switch module 507 delivers the future state of each valve assembly 410 to the output module 506.

According to an exemplary embodiment, the pattern generation module 505 generates a geometric pattern sequence for the valve assemblies 410 and delivers the pattern sequence to the pattern switch module 507. The pattern switch module 507 determines the state of each of the individual valve assemblies 410 (e.g. the open state, the closed state, etc.) and the future state of each of the valve assemblies 410 to complete the pattern sequence created in the pattern generation module 505. The pattern switch module 507 is further configured to determine if the pattern sequence received from the pattern generation module 505 will cause one of the valve assemblies 410 to overpressure. If the pattern switch module 507 determines that the pattern sequence will cause one of the valve assemblies 410 to overpressure at any point during the pattern sequence, the pattern switch module 507 will prevent the pattern sequence from being sent to the output module 506. The output module 506 is configured to count the number of valve assemblies 410 in an open state, and determine if the fluid flow rate of the showerhead assembly 100 is within the minimum and maximum range. If the fluid flow rate is within the minimum and maximum range, the output module 506 will deliver the pattern sequence to the valve assemblies 410 and the valve assemblies 410 will execute the pattern sequence. If the fluid flow rate is not within the minimum and maximum range, the output module 506 will prevent the delivery of the pattern sequence to the valve assemblies 410. In various exemplary embodiments, if a pattern sequence is prevented from being delivered to any step, an error message will display on the graphical user interface 508.

Figure 7:
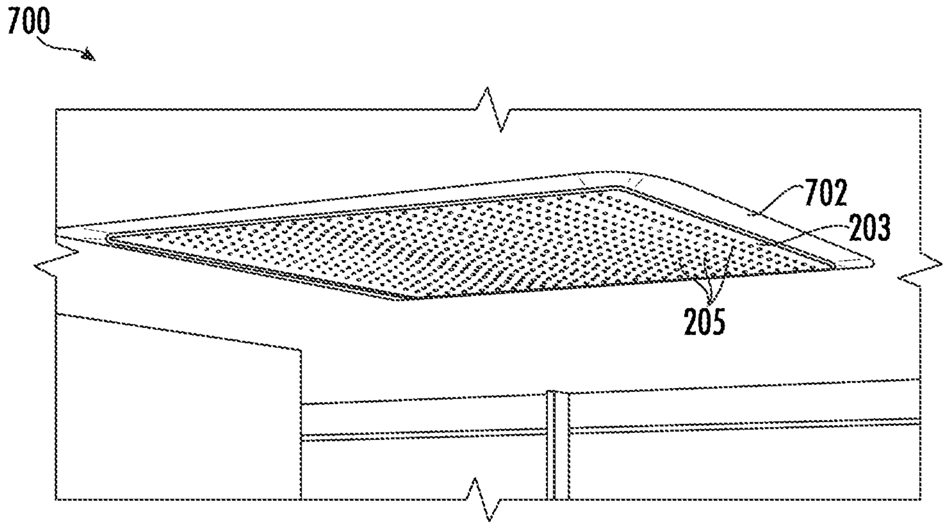
FIG. 7 is an illustration of a showerhead assembly, according to an exemplary embodiment.

Referring to FIG. 7, a showerhead assembly 700 is shown, according to an exemplary embodiment. The showerhead assembly 700 may be an exemplary embodiment of the showerhead assembly 100 shown in FIG. 1. As shown in FIG. 7, the showerhead assembly 700 may be recessed in the ceiling, such that the electronics and other features are not exposed, as described below. The non-recessed portion of the showerhead assembly 700 may be configured to only show the bottom plate 203, the showerhead outlets 205, and a frame member 702. The frame member 702 may be coupled to the showerhead assembly 700 (e.g., the bottom plate 203), and may be configured to hold the showerhead assembly 700 recessed in the ceiling. In an exemplary embodiment, the frame member 702 and the showerhead assembly 700 (i.e., the bottom plate 203) are configured to be flush with the ceiling.

Figure 8:
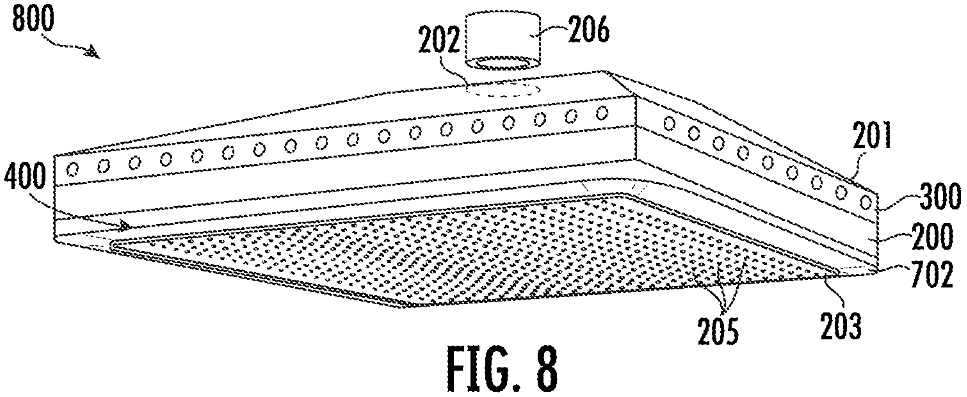
FIG. 8 is an illustration of the showerhead assembly of FIG. 7.

Referring to FIG. 8, the showerhead assembly of FIG. 7 is shown. As shown in FIG. 8, the showerhead assembly 700 may include electronics and other features recessed in the ceiling, for example the valve layer 400, the showerhead housing 300, the distributor 300, the valve assemblies 410, the controllers 500, etc. Like showerhead assembly 100 of FIG. 1, the showerhead housing 200 may have a bottom plate 203 and a top plate 201. The top plate 201 may also include a fluid inlet 202, which is configured to couple to a fluid source (e.g., a household water line at a conventional ball joint 206). In an exemplary embodiment, the showerhead housing 200 may house the electronics and features of showerhead assembly 700 (e.g., the valve layer 400, the valve assemblies 410, the controllers 500, etc.), and may be recessed in the ceiling for safety, ease in manufacturing, aesthetic appeal, etc.

Figure 9:
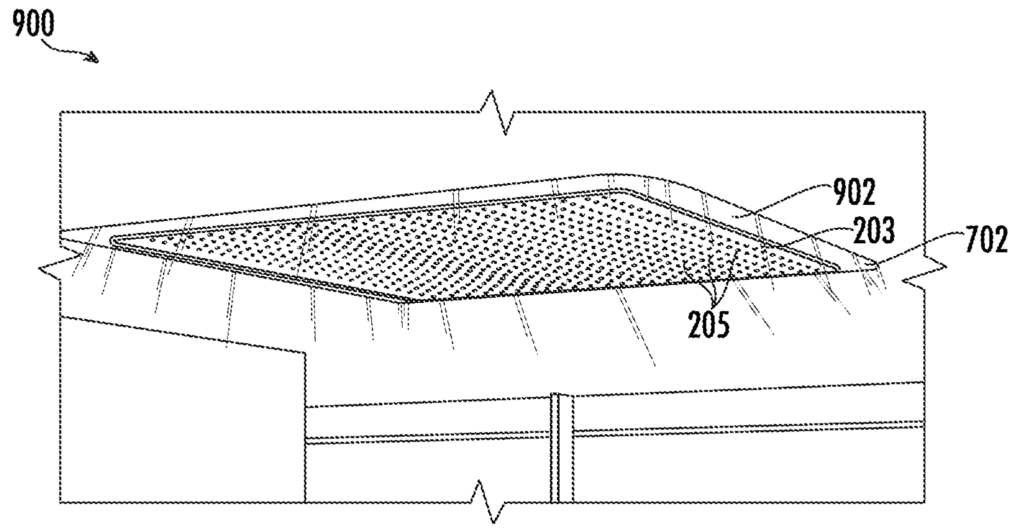
FIG. 9 is another illustration of a showerhead assembly, according to another embodiment.

Referring to FIG. 9, a showerhead assembly 900 is shown, according to another embodiment. The showerhead assembly 900 may be an exemplary embodiment of the showerhead assembly 100 of FIG. 1 and/or the showerhead assembly 700 of FIG. 7. As discussed with regard to FIGS. 7-8, features of the showerhead assembly 900 may be recessed in the ceiling. The non-recessed portion of the showerhead assembly 900 may be configured to show the bottom plate 203, the showerhead outlets 205, the frame member 702, and a frame lighting 902. In an exemplary embodiment, the frame lighting 902 is disposed on the frame member 702. In these embodiments, when the frame lighting 902 is activated, the frame lighting 902 provides a user with an esthetically pleasing view of an illuminated perimeter around the bottom plate 203 and the showerhead assembly 900 (i.e., the frame member 702). The frame lighting 902 is configured to display colors across the entire spectrum, and may display several colors simultaneously. In this regard, the user may develop a theme by displaying a plurality of colors or a specific color.

Figure 10:
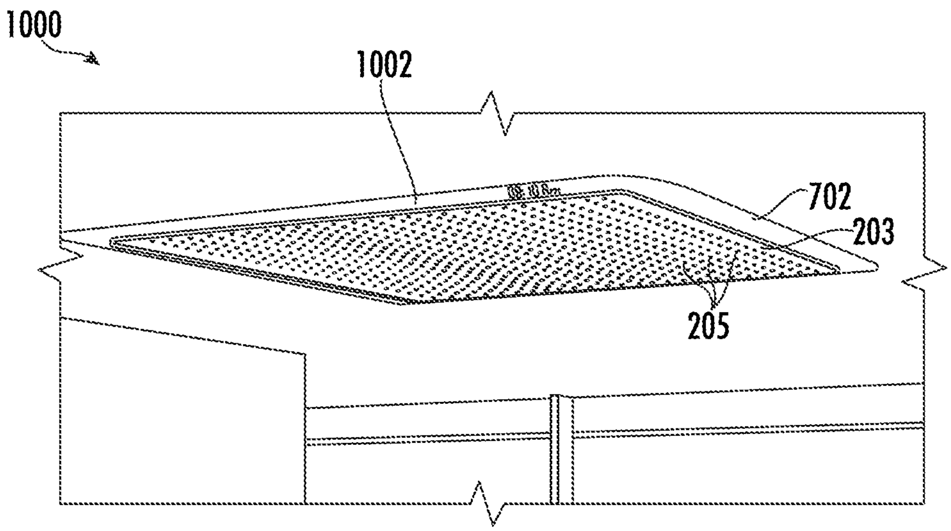
FIG. 10 is yet another illustration of a showerhead assembly, according to another embodiment.

Referring to FIG. 10, a showerhead assembly 1000 is shown, according to another embodiment. The showerhead assembly 1000 may be an exemplary embodiment of the showerhead assembly 100 of FIG. 1, the showerhead assembly 700 of FIG. 7, and/or the showerhead assembly 800 of FIG. 8. As discussed above, features of the showerhead assembly 1000 may be recessed in the ceiling. The non-recessed portion of the showerhead assembly 1000 may be configured to show the bottom plate 203, the frame member 702, and a stadium lighting 1002. In an exemplary embodiment, the stadium lighting 1002 is disposed on the frame member 702, and may include a plurality of small display panels, light emitting diodes (LEDs), or any other suitable light source. In these embodiments, when the stadium lighting 1002 is activated, the stadium lighting 1002 provides the user with a sign, the time, a saying or message, a note, etc. (e.g. "8:10 AM") around the bottom plate 203 and the showerhead assembly 1000 (e.g., the frame member 702). The stadium lighting 1002 is configured to display colors across the spectrum, and may display colors simultaneously.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the assembly and system as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A showerhead assembly, comprising:

a showerhead housing including a top plate, a bottom plate, and a plurality of sidewalls extending between the top plate and the bottom plate, wherein the top plate includes a fluid inlet configured such that the fluid inlet couples to a fluid source;

a distributor plate including a plurality of intersecting channels and at least one distributor outlet, the distributor situated in the showerhead housing; and a valve layer positioned on the bottom plate and including a plurality of valve assemblies, the valve layer situated in the showerhead housing, wherein the plurality of channels of the distributor plate are configured such that the channels disperse fluid from the fluid inlet to the at least one distributor outlet, and the at least one distributor outlet is coupled to, and configured such that the distributor outlet disperses fluid to the plurality of valve assemblies of the valve layer.

2. The showerhead assembly of claim 1, wherein the plurality of valve assemblies further comprise:

an inlet conduit having at least one valve assembly inlet, wherein the at least one valve assembly inlet is coupled to the at least one distributor outlet; and an outlet conduit having at least one valve assembly outlet, wherein the at least one valve assembly outlet is coupled to one of at least one showerhead outlets, wherein the inlet conduit is coupled to the outlet conduit.

3. The showerhead assembly of claim 2, wherein the plurality of valve assemblies further comprise a valve coupled to the inlet conduit and the outlet conduit, wherein the valve is operable between an open state and a closed state, which is selectively changable in response to an input.

4. The showerhead assembly of claim 3, wherein the valve is positioned in the open state and selectively changed to the closed state in response to the input.

5. The showerhead assembly of claim 2, wherein the at least one valve assembly inlet includes a first plurality of valve assembly inlets, and the at least one valve assembly outlet includes a second plurality of valve assembly outlets.

6. The showerhead assembly of claim 5, wherein the first plurality of valve assembly inlets and the second plurality of valve assembly outlets are configured in square pattern arrangements.

7. The showerhead assembly of claim 5, wherein the first plurality of valve assembly inlets and the second plurality of valve assembly outlets are configured in linear pattern arrangements.

8. The showerhead assembly of claim 5, wherein the first plurality of valve assembly inlets are different in number than the second plurality of valve assembly outlets.

9. A showerhead assembly, comprising:

a showerhead housing including a top plate, a bottom plate, and a plurality of sidewalls extending between the top plate and the bottom plate, wherein the top plate includes a fluid inlet configured such that the fluid inlet couples to a fluid source;

a distributor plate disposed in the showerhead housing, and including a plurality of intersecting channels and a plurality of distributor outlets, and the plurality of channels are configured such that the channels receive fluid from the fluid inlet and disperse fluid to the plurality of distributor outlets;

a valve layer disposed in the showerhead housing and positioned on the bottom plate, and including a plurality of valve assemblies, and the plurality of valve assemblies are coupled to and configured such that the valve assemblies receive fluid from the plurality of distributor outlets; and a frame member coupled to the bottom plate and the showerhead housing.

10. The showerhead assembly system of claim 9, further comprising:

one or more processing circuits comprising one or more memory devices coupled to one or more processors, the one or more memory devices configured such that the memory devices store instructions thereon that, when executed by the one or more processors, cause the one or more processors to perform operations comprising:

generate a geometric pattern sequence for the plurality of valve assemblies;

compare a plurality of pressures of each of the plurality of valve assemblies based on the geometric pattern sequence to a plurality of threshold pressures of each of the plurality of valve assemblies;

compare a fluid flow rate based on the geometric pattern sequence to a threshold range of fluid flow rates; and execute the geometric pattern sequence in response to comparing the plurality of pressures of each of the plurality of valve assemblies based on the geometric pattern sequence to the plurality of threshold pressures of each of the plurality of valve assemblies and comparing the fluid flow rate based on the geometric pattern sequence to the threshold range of fluid flow rates.

11. The showerhead assembly of claim 10, the operations further comprising inhibit delivery of the geometric pattern sequence to the plurality of valve assemblies in response to determining the plurality of pressures of each of the plurality of valve assemblies based on the geometric pattern sequence is greater than the plurality of threshold pressures of each of the plurality of valve assemblies.

12. The showerhead assembly of claim 11, the operations further comprising provide an error message to a graphical user interface in response to inhibiting delivery of the geometric pattern sequence to the plurality of valve assemblies.

13. The showerhead assembly of claim 10, the operations further comprising inhibit delivery of the geometric pattern sequence to the plurality of valve assemblies in response to determining the fluid flow rate based on the geometric pattern sequence is not within the threshold range of fluid flow rates.

14. The showerhead assembly of claim 13, the operations further comprising provide an error message to a graphical user interface in response to inhibiting delivery of the geometric pattern sequence to the plurality of valve assemblies.

15. The showerhead assembly of claim 10, the operations further comprising deliver the geometric pattern sequence to the plurality of valve assemblies in response to determining the plurality of pressures of each of the plurality of valve assemblies based on the geometric pattern sequence is not greater than the plurality of threshold pressures of each of the plurality of valve assemblies.

16. The showerhead assembly of claim 10, the operations further comprising deliver the geometric pattern sequence to the plurality of valve assemblies in response to determining the fluid flow rate based on the geometric pattern sequence is within the threshold range of fluid flow rates.

17. The showerhead assembly of claim 9, wherein the frame member further includes stadium lighting configured such that the stadium lighting displays at least one of a time, a message, a saying, or a notification.

18. The showerhead assembly of claim 17, wherein the stadium lighting further includes a plurality of display panels.

19. The showerhead assembly of claim 9, wherein the showerhead housing and the frame member are configured such that the showerhead housing and the frame member are flush with a ceiling.

20. The showerhead assembly of claim 9, wherein the frame member further includes frame lighting.

* * * * *